United States Patent [19]
Chernykh

[11] 3,951,417
[45] Apr. 20, 1976

[54] ROTARY SHAFT END SEAL FOR APPARATUS OPERATING UNDER PRESSURE

[76] Inventor: Vitaly Petrovich Chernykh, ulitsa Kurchatova, 9, kv. 4, Irkutsk, U.S.S.R.

[22] Filed: Oct. 3, 1973

[21] Appl. No.: 403,214

[52] U.S. Cl. .............................. 277/33; 277/67; 277/70; 277/83; 277/92
[51] Int. Cl.² .................................. F16J 15/00
[58] Field of Search .............. 277/83, 92, 33, 70, 277/67, 65, DIG. 8

[56] References Cited
UNITED STATES PATENTS

| | | | |
|---|---|---|---|
| 2,494,887 | 1/1950 | Lenhart | 277/22 |
| 2,599,122 | 6/1952 | Park | 277/65 |
| 2,884,268 | 4/1959 | Amirault et al. | 277/92 X |
| 3,333,856 | 8/1967 | Voitik | 277/65 |

*Primary Examiner*—Samuel B. Rothberg
*Attorney, Agent, or Firm*—Haseltine, Lake & Waters

[57] ABSTRACT

A rotary shaft end seal for apparatus operating under pressure comprises a set of working members which are located between the end faces of annular shoulders provided on the shaft and on the housing encompassing the shaft. The set of working members is accommodated in a chamber providing for circulation of sealing fluid. The set of working members consists of an antifriction sliding ring and an elastic ring, each being in contact with the end face of one of said annular shoulders, as well as of a metal ring disposed between the antifriction ring and the elastic ring, said metal ring being loosely mounted on the shaft. The annular shoulders of the shaft and housing are arranged in such a manner that the force from the internal pressure in the apparatus tends to cause an axial displacement of the shaft so as to compress the set of the working members, and the shaft is spring-loaded so as to be biased in the direction of said displacement.

15 Claims, 10 Drawing Figures

ROTARY SHAFT END SEAL FOR APPARATUS OPERATING UNDER PRESSURE

The invention relates to equipment for mixing and pumping liquid and gaseous materials, as well as for performing physical and chemical processes in heterogenous systems, and is concerned with a rotary shaft end seal for use in apparatus operating under pressure.

More specifically, the invention may be used in seals for centrifugal pumps, rotary compressors, centrifuges rotary feeders and dischargers, rotary columns, autoclaves, cut-off and control fittings and other equipment operating under high pressure and at elevated temperatures.

At present rotary shaft end seals are extensively used since they provide a high degree of tightness and wear resistance, while being simple in maintenance and inexpensive in operation. The end seals are successfully employed in replacing other types of rotary shaft seals. Thus, in apparatus operating under comparatively low pressure the end seals have completely replaced the rotary shaft stuffing-box seals.

Various types of known end seals are designed on the basis of a common principle. Generally, an end seal comprises a set of working members including an antifriction carbon-graphite ring and a metal (steel) ring. One of these rings is fitted on the shaft, and the other is accommodated in the seal housing, the rings being fitted tightly and sealed by means of elastic rubber rings. The antifriction ring and the metal ring are in contact therebetween with their end faces forming a sliding couple, and are urged against one another by means of springs. The set of working members may be accommodated in a chamber through which sealing fluid is circulated, this fluid being under a pressure which is somewhat higher than that in the working space of the apparatus. The sealing fluid also serves to cool and lubricate the working members of the seal. The use of sealing fluid improves the extend of tightness and operability of the end seal.

Various types of the end seals have different gaps and clearances between the members thereof, which determine the leakage of the working fluid from the apparatus, and hence the level of pressure which can be developed and continually maintained in the working space of the apparatus.

The types of the ends seals differ through the structural features of the set of working members and elastic sealing members. These features determine the extent of tightness of the end seals under static and dynamic operating conditions.

The end seals may have stationary and rotatable elastic members, these members being divided internal and external ones depending upon their arrangement relative to the working fluid.

Depending upon the number of sets of the working members the end seals are divided into single, double, triple seals and so forth.

The most difficult problem encountered in the sealing technique is to ensure the sealing of rotary shafts under high pressure and at elevated temperature in the working space of the apparatus. The double end seals or double-action end seals, in which sealing fluid circulates through the seal chamber accommodating the working members of the seal, are the most promising for that purpose. The sealing members in the stationary joints of such seals comprise rubber O-rings and bevel PTFE rings.

Thus, a known double end seal for operation under a pressure up to 84 kgf/cm$^2$ and at $-40°$ C $- +80°$ C comprises a seal having two sets of the working members. Each set of the working members comprises a carbon-graphite sliding ring and a steel sliding ring. The carbon-graphite sliding ring is enclosed in a metal ring and is sealed on the shaft by means of an elastic rubber ring.

The carbon-graphite ring is axially movable together with the metal ring along the shaft under the action of several helical springs, one end of the springs abutting against the metal ring embracing the carbon-graphite sliding ring, and the other end resting against the end face of the shaft shoulder.

The steel sliding ring is accommodated in the seal housing and is sealed along the outer periphery thereof by means of an elastic sealing ring of round cross-section. The sets of the working members are enclosed in a sealing chamber which provides for circulation of sealing fluid, the latter of which also serves to cool and lubricate the working members of the seal.

However, when operating under high pressure the degree of cooling of the working members of such an end seal with sealing fluid is rather insufficient, and the working members are overheated and damaged. Elastic rubber rings are overheated, pressed out into the gaps and damaged. The above-described seal cannot ensure a required tightness in an apparatus operating under high pressure.

This end seal has been more recently improved, taking into account the above-mentioned disadvantages, and there has been developed a double end seal for operation under a pressure of up to 100 kgf/cm$^2$ at $-40°$ C $- +80°$ C and at a shaft speed of up to 3000 r.p.m.

As distinct from the old seal, the newer seal had one common helical spring for compression of the sliding rings for shafts of a diameter of up to 100 mm.

The greatest attention was drawn to the cooling of the working members of this seal.

The steel sliding rings thereof are stationary and are tightly accommodated in the seal housing and provided with an annular groove on the outer surface, the circulating fluid being fed into this groove to ensure better removal of heat released during the friction between the steel and carbon-graphite sliding rings. In order to solve the problem of transmission of the friction torque from the carbon-graphite ring to the shaft, two keys are provided to prevent the metal rings embracing the carbon-graphite rings from rotating on the shaft. The metal rings are provided with four lugs inserted into the carbon-graphite rings.

The carbon-graphite rings are sealed in the metal rings by means of rubber O-rings.

This construction of the seal improved its performance under high pressure, however high temperature is developed in the seal during the operation of the apparatus, and as a result the rubber rings would fail under pressure.

Furthermore, a new modification of the double-action end seal has been developed, in which the sealing rings of the stationary joints, that is the shaft and housing seals, were made of PTFE in the form of bevel rings.

This seal was intended to operate under a pressure of up to 10 kgf/cm$^2$ and up to 50 kgf/cm$^2$ with the hydraulic unloading of the seal and at a temperature of from −84° C up to +250° C.

In a further improved modification of this seal all rubber rings were replaced by PTFE bevel rings and gaskets, and this modification of the seal was intended to operate under a pressure of up to 100 kgf/cm².

However, all the above-described end seals exhibited the following disadvantages.

The working members of the seal operate under the complete pressure difference, that is under the pressure which is equal to the difference between the pressure in the working space of the apparatus and atmospheric pressure of the environment. This results in that rubber and PTFE rings sealing the stationary joints will be overloaded under high pressure and will be pressed out through the gaps between the parts which are being sealed. The hydraulic unloading of the carbon-graphite rings cannot completely eliminate the overload of the working members of the seal since it does not reduce the overload of the rubber and PTFE sealing rings.

The use of rubber and PTFE sealing rings of a conical shape impairs the conditions of self-alignment of the sliding rings — the carbon-graphite and the metal ring — over the end faces of the seal.

Fluoroplastic yields under high pressure, and the seal incorporating the PTFE rings and gaskets may become unsealed.

The use of a single set of the working members for sealing the shafts of apparatus operating under high pressure, such as of autoclaves operating under 100 kgf/cm² and higher, is generally insufficient since, in the case of failure of the carbon-graphite ring, all working fluid will escape out of the apparatus, which is inadmissible in the case, where expensive, and especially toxic and explosive, materials are to be handled.

At the same time, the design of the known double end seal does not allow for hydraulic unloading of the rubber and PTFE sealing rings, whereby it is difficult to use these seals for operation at a pressure of 100 kgf/cm² and higher.

The shaft, on which the double end seal is mounted, is not sufficiently cooled which complicates the employment of such end seals for the shafts of the agitators of autoclaves and reactors having a temperature of the medium treated in their working space of up to several hundreds degrees centigrade.

The presence of the keys and lugs for transmission of the friction torque from the carbon-graphite ring to the shaft considerably impairs the operating conditions, and in some cases even makes it impossible to ensure tight fit of the carbon-graphite ring on the end face of the steel ring when operating under high pressure, whereby leakage occurs.

As the sealing and lubricating fluid in the double end seals of known design, use is made of high-grade mineral oils with special additives, which is rather inconvenient and in certain cases even inadmissible where the end seal is intended for sealing the shafts of autoclaves and reactors in which the presence of oil and additives contained therein may shift the production process in an undesirable direction or completely interrupt the process. In some cases, the use of oil is inadmissible due to the fact that one of the reactants is oxygen or other active substance, which may result in inflammation of the seal and explosion of the apparatus incorporating the seal.

Rubber O-rings used in that design of the seal are unsuitable since, when operating under high pressure, they are overcompressed in the annular space so as to hamper the displacement of the movable rings of the working set along the shaft, thereby complicating the obtention of the required tight seal.

In an apparatus incorporating such seals it is difficult to stop the leakage of the sealing and working fluid from the apparatus after the unsealing of the couple of the sliding rings of the set of working members has taken place.

Water, technological solutions or organic liquids also cannot be used as the sealing fluid in such apparatus due to the corrosion and damages to the springs loading the sliding rings of the set of the working members of the seal.

Fixed position of the carbon-graphite rings, which are thus prevented from rotating, is rather inconvenient since difficulties are encountered in eliminating misalignment on one-side wear of the sliding rings in a set of the working members of the seal.

The arrangement of the carbon-graphite rings on the shaft with a large annular gap results in misalignment and clearance between the couple of the sliding rings thereby leading to loss of tightness under high pressure.

The use of the springs and the rings of the set of the working members of the seal movable along the shaft complicates the dynamic balancing of the end seal which is to be operated with the high-speed rotary shafts.

The presence of lugs, pins and other elements of the transmission subjected to the friction torque from the carbon-graphite ring to the rotating shaft, results in a reduced strength of the carbon-graphite rings and may lead to their failure under high pressure.

Known end seals require an intricate lubrication and sealing fluid supply system including numerous assemblies and devices both in the case of the static system of the sealing fluid supply and in the case where a circulation system is used.

As a result the double end seal is unreliable in operation under high pressure. In order to ensure reliable operation of the end seal, it is necessary to create a reliable sealing fluid supply system which would be operable under a pressure higher than that of the apparatus incorporating the end seal.

The complicated circulation sealing fluid system which is required during the operation of the apparatus under high pressure and at elevated temperatures results in considerable increase in the production cost and difficulties in operation of the seal.

Minor troubles in the circulation system for sealing fluid result in failure of the end seal, and hence of the apparatus incorporating the latter.

For operation of the end seal, a high-grade mineral oil with special additives is charged into the circulation and static system for sealing fluid, which also results in a higher cost of the seal operation.

The lubricating liquid used in such end seal should be under a pressure by 1.5 – 2 kgf/cm² higher thyn the pressure in the working space of the apparatus. This results in the penetration of the lubricant into the working space of the apparatus which may lead to changes in the production process (chemical reactions) conducted in the apparatus.

The lubricating liquid supply systems are complicated, combersome and expensive. An external high-pressure source is required for operation of the system. In addition, with frequent changes in the pressure in the apparatus a complicated automatic system for supplying lubricating liquid is necessary.

It is an object of the invention to provide a rotary shaft end seal for apparatus operating under pressure which is capable of operating under a pressure of several hundreds of atmospheres.

It is another object of the invention to provide an end seal suitable for rotary shafts operating over a wide temperature range beginning with −80° - 100° C and up to +500° C - 800° C.

Still another object of the invention is to provide an end seal suitable for shafts of apparatus handling highly aggressive and abrasive heterogenous polyphase systems.

Furthermore, it is an object of the invention to provide an end seal suitable for sealing the shafts rotating at a speed of up to 10,000 r.p.m.

It is also an object of the invention to provide an end seal having a high degree of tightness ensuring minimum leakage of the sealing and working fluid from the apparatus.

It is another object of the invention to provide an end seal which is simple, highly reliable in operation and inexpensive in maintenance.

Still another object of the invention is to provide an end seal which has a design ensuring automatic self sealing.

The above objects are accomplished in that in a rotary shaft end seal for apparatus operating under high pressure, a set of working members is located between the end faces of annular shoulders provided on the shaft and on the seal housing embracing the shaft, the set of working members being accommodated in a chamber serving for circulation of sealing fluid therethrough. According to the invention, the set of the working members comprises an antifriction sliding ring and an elastic ring fitted on the shaft, each being in contact with the end face of one of said shoulders, and a metal disposed between the antifriction sliding ring and the elastic ring and loosely mounted on the shaft, the shaft being spring-loaded and is capable of moving along its axis effecting the clamping of the set of working members.

It is advantageous that the antifriction sliding ring be in contact with the end face of the annular shoulder of the housing, and the elastic ring should be in contact with the end face of the annular shoulder of the shaft.

The antifriction sliding ring is preferably made of carbon-graphite and the elastic ring of a chemically and heat resistant rubber.

The metal ring is preferably provided with a shoulder at one end face thereof which embraces the outer periphery of the elastic ring over a fraction of its height.

The metal ring can also be provided on the opposite end face surfaces with two annular shoulders, one of which partially embracing the elastic ring as to height along the outer diameter, and the other shoulder — the antifriction sliding ring.

It is expedient to provide the metal ring with blades arranged along its outer diameter which ensure jointly with the inner walls of said chamber the circulation of the sealing fluid through said chamber in the process of the shaft rotation.

The elastic ring may be made externally conical.

The metal ring is preferably internally provided with an annular groove open to the shaft, the cavity of the groove communicating with passages for feeding cooling fluid made in the shaft and housing.

The end seal may comprise several sets of the working members located respectively between the end faces of several annular shoulders provided on the shaft and on the seal housing embracing the shaft, the working members of the seal being of any of the above-described construction or of any combination thereof.

It is desirable to have in the end seal, which is composed of several sets of the working members, at least one set of the working members which is proximate to the working space of the apparatus, in which the metal ring is internally provided with an annular groove open to the shaft. The housing of the seal and the shaft should be provided with a system of passages serving for circulation of sealing fluid through the sealing fluid chambers of the sets of the working members, the sealing fluid in the sealing fluid chamber of the set of the working members which is the nearest one to the working space of the apparatus being under a pressure which is equal ot somewhat lower than the operating pressure of the apparatus, while the pressure of the sealing fluid in subsequent chambers of the sets of the working members diminishes through these chambers away from the working space of the apparatus, and through the cavity of the annular groove communicating with the chamber for sealing fluid of the set of the working members adjacent thereto and more remote from the working space of the apparatus.

The working space of the apparatus is preferably separated from the sealing fluid chamber of the set of the working members by the antifriction ring which is in contact with the respective annular shoulder of the shaft with one end face thereof, while the other end face of the ring is in contact with the annular shoulder of the seal housing.

The end seal according to the invention ensures a high degree of tightness under a pressure in the apparatus incorporating 100 kgf/cm$^2$ and higher. There is substantially no leakage of sealing fluid from the apparatus, which is important in the continuously operating apparatus.

Where the hydropneumatic unloading of the end seal according to the invention is used, this seal can be employed in apparatus operating under a pressure of several hundreds of atmospheres.

The end seal is provided with an intensive water cooling and is cooled with sealing fluid, whereby it can be used for sealing the shafts of the apparatus operating at very high temperatures (up to 700° C – 800° C).

The end seal may be readily balanced, whereby it can be used for sealing rotary shafts operating at a speed of up to 10,000 r.p.m. (but not under very high pressure).

This seal withstands chemical action and the action of strong heterogenous systems, and due to its high degree of tightness it is abrasion-resistant.

The end seal is highly vibration-resistant, since each set of the working members comprises an elastic sealing ring, such as of rubber, abutting against the end face of the shaft shoulder; the seal withstands the action of sealing fluid since the spring axially urging the shaft is arranged outside the seal and operates under normal conditions; yet the seal is easy to manufacture, simple in assembly and operation. The seal is automatically self-sealing, is of simple structure, reliable in operation and inexpensive in maintenance.

The invention will now be described in detail with reference to specific embodiments thereof illustrated in the accompanying drawings, in which.

Figure 1:
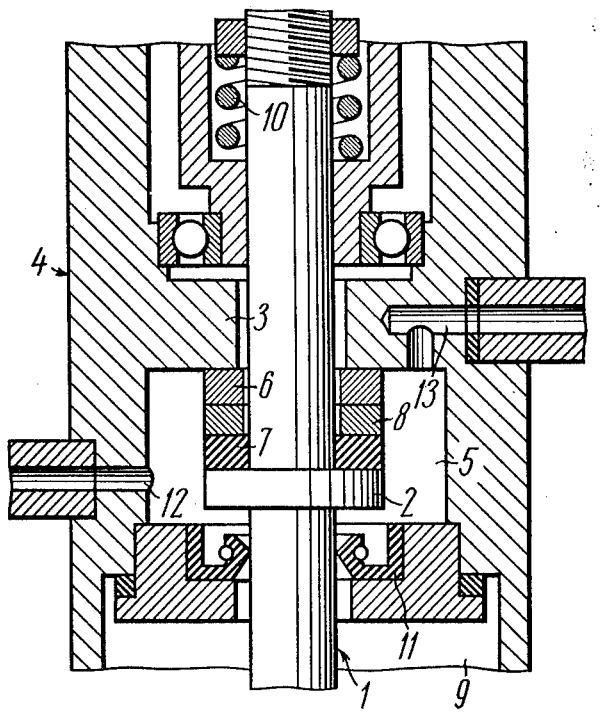
FIG. 1 shows a longitudinal section of a rotary shaft end seal according to the invention for an apparatus operating under pressure.

The end seal of a rotary shaft 1 (FIG. 1) for an apparatus operating under pressure comprises a set of working members located between the end faces of an annular shoulder 2 provided on the shaft 1, and an annular shoulder 3 of a housing 4 of the seal accommodated in a chamber 5, through which sealing fluid circulates.

The set of working members comprises an antifriction sliding ring 6, an elastic sealing ring 7, and a metal sliding ring 8 located between the antifriction ring 6 and the elastic ring 7 and which is loosely mounted on the shaft 1. The antifriction sliding ring 6 is in contact with the end face of the annular shoulder 3 of the housing 4, while the elastic ring 7 is in contact with the end face of the annular shoulder 2 of the shaft 1, and shaft 1 under action of the inner pressure of the medium in working space 9 of the apparatus can move along its axis and clamp the set of the working members between the end face surfaces of annular shoulders 2 and 3. It is also facilitated by the fact that shaft 1 is spring-loaded in the given direction with the aid of spring 10.

The chamber 5 for circulation of sealing fluid is formed between the shaft 1 and the housing 4 and is shaped as an annular passage, one side of the passage being sealed by means of the set of the working members of the end seal, and the other side being sealed with a seal which may comprise, for instance, an elastic collar 11. Sealing fluid is fed into the chamber 5 through a passage 12 in the housing 4 and is discharged through a passage 13. The elastic sealing ring 7 is preferably made of a chemically and heat resistant rubber. The elastic ring 7 is tightly fitted on the shaft 1 so as to thrust against the end face of the annular shoulder 2 and is adapted to seal on the shaft the metal ring 8 over its end face, as well as to elastically seal the entire set of the working members over the end faces of the annular shoulders 2 and 3 of the shaft 1 and housing 4 respectively.

The metal sliding ring 8 is loosely mounted on the shaft 1 with a small gap and is capable of self-aligning on the shaft over the end face thereof.

Upon axial displacement of the shaft 1 the metal ring 8 is tightly pressed against the elastic ring 7, and due to the friction force over the rubber, of which the elastic ring is made, the ring 7 is prevented from rotating on the shaft 1.

The antifriction sliding ring 6 is preferably made of carbon-graphite.

The antifriction sliding ring 6 is of the floating type so that it may freely rotate on and axially move along the shaft 1.

Figure 2:
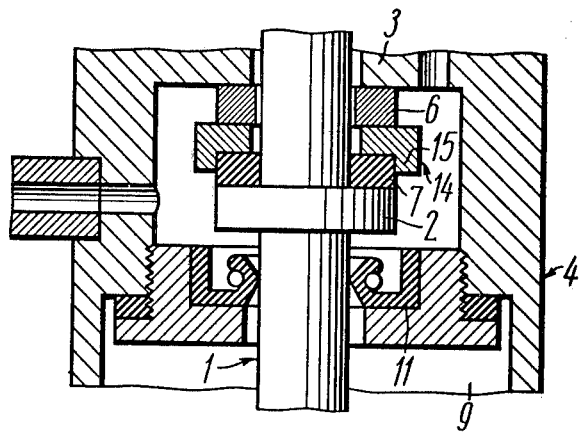
FIG. 2 shows a longitudinal section of an end seal according to the invention having a metal ring provided with a shoulder.

The antifriction sliding ring 6 is adapted to seal the movable joint between the end faces of the annular shoulder 3 of the housing 4 and the metal ring 8. The end seal may be provided with a metal ring 14 (FIG. 2) which has at one end face a shoulder 15 which embraces the outer periphery of the elastic ring 7 over a fraction of its height.

This embodiment of the metal ring 14 allows for more reliable fastening thereof on the sealing elastic ring 7 and thereby to prevent the metal ring 14 from rotating under high pressure, whereby the degree of tightness is improved, and the elastic sealing ring 7 is protected against wear and failure.

Figure 3:
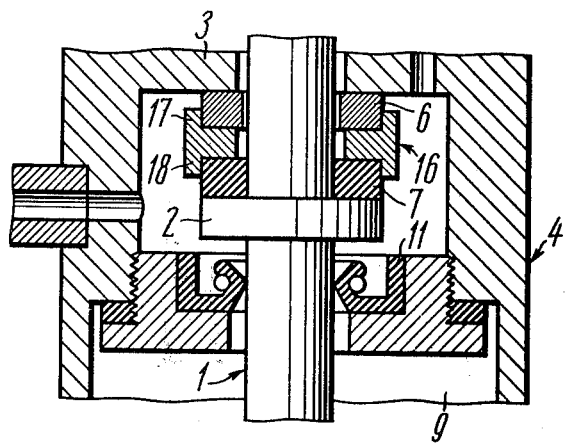
FIG. 3 shows a longitudinal section of an end seal according to the invention having a metal ring provided with two shoulders.

The end seal may also be provided with a metal ring 16 (FIG. 3) having shoulders 17 and 18 at both end faces thereof, the shoulder 17 embracing the outer periphery of the antifriction sliding ring 6 over a fraction of its height, and the shoulder 18 embracing the elastic ring 7 in the same manner.

This embodiment of the metal ring 16 improves its alignment on the shaft 1 due to the antifriction sliding ring 6, which is snug fitted on the shaft 1. This ensures the improvement of the degree of tightness and operability of the set of the working members.

The end seal according to the invention may have a metal ring 19 (FIG. 4) which is externally provided with blades 20 ensuring jointly with the inner walls of said chamber 5 the circulation of the sealing fluid through said chamber 5 in the process of rotation of shaft 1 forming together with the adjacent internal surface of the chamber 5 for sealing fluid, a pump providing the circulation of sealing fluid through the chamber 5 during the rotation of the shaft 1. The provision of the blades 20 on the metal ring 19 permits to effect pumping, that is circulation of sealing fluid in a closed circuit under high pressure, with the sealing fluid passing through a receptacle for sealing fluid (not shown), wherein it is collected and refined (settled) in order to remove the products of wear of the carbon-graphite antifriction sliding ring 6, metal ring 19 and an elastic rubber ring 21. This embodiment of the circulation and cooling system for sealing fluid is very simple, while being highly reliable.

The above-described method of supplying and circulating sealing fluid is substantially simpler, more reliable and less expensive than that used in the sealing fluid circulation systems of known end seals.

Figure 4:
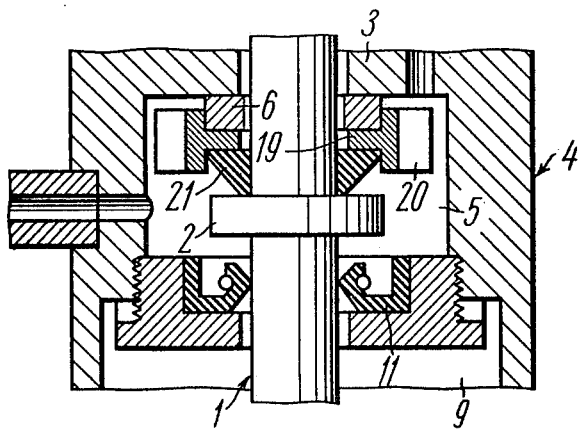
FIG. 4 shows a longitudinal section of an end seal according to the invention having a metal ring provided with blades.

As shown in FIG. 4, the elastic rubber ring 21 is of a conical outer shape which improves the tightness of the seal due to a better self alignment of the antifriction sliding ring 6 and the metal ring 19 over the end faces and results in reduced axial force to be applied to the shaft 1 to achieve the tight assembly of the seal. The bevelled elastic ring 21 is advantageous also due to the fact that it appropriately fills the space between the shaft 1 and the face of the metal ring 19 and maintains its geometrical shape under high pressure in the working space 9 of the apparatus.

This embodiment ensures a constant geometrical shape, arrangement and dimensions of the set of the working members of the seal under high pressure which is favourable for operability of the end seal as a whole.

Figure 5:
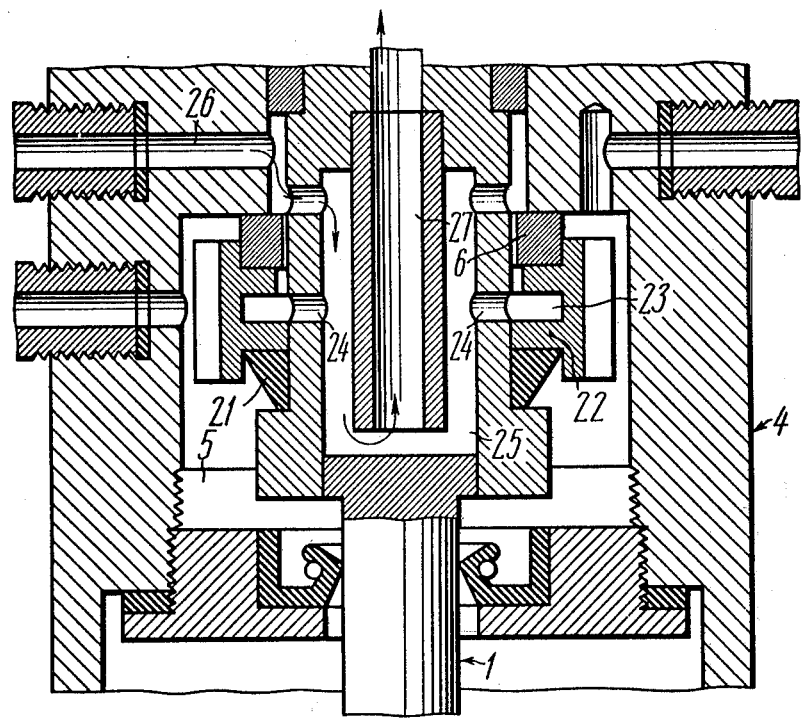
FIG. 5 shows a longitudinal section of an end seal according to the invention having a metal ring provided with an annular groove.

A metal ring 22 (FIG. 5) of the end seal according to the invention may be internally provided with an annular groove 23 open to the shaft 1. The cavity of the annular groove 23 communicates through radial passages 24 with the internal annular passage 25 of the shaft 1 which communicates with a passage 26 in the housing 4. The shaft 1 is also provided with an axial passage 27 which communicates with a passage (not shown) in the housing 4 and with the annular passage 24. These passages serve to supply cooling fluid, which is fed through the passage 26, into the annular passage 25 and the annular groove 23 to cool the metal ring 22, whereafter it is discharged from the seal housing 4 through the axial passage 27. The metal ring 22 is intensively cooled by the circulating cooling fluid from the inside and by the sealing fluid circulating through the chamber 5 from the outside. The presence of the annular groove 23 permits to cut-off the heat flow from the end faces of the antifriction sliding ring 6 and metal ring 22 which is transferred by heat conductance towards the elastic sealing ring 21. This embodiment of the metal ring 22 allows for considerable reduction of thermal action upon the elastic sealing ring 21 which is very important where the elastic ring 21 is made of rubber. Such new structure of the metal ring 22 also improves the cooling of the antifriction sliding ring 6.

All the above-described measures result in improved performance of the end seal under high pressure.

Figure 6:
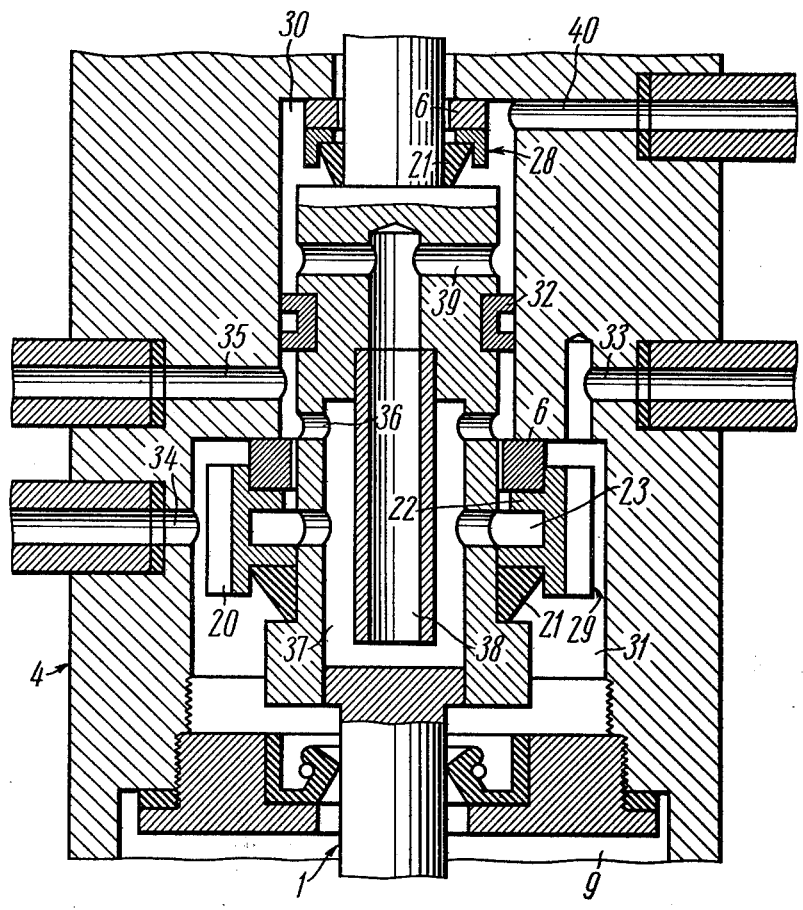
FIG. 6 shows a longitudinal section of an end seal according to the invention having two sets of working members.

The end seal according to the invention may comprise a plurality of sets of working members, and different sets incorporated in the end seal may consist of the working members of different design similar to those above-described, while the end seal may include either the sets of one and the same type (not shown in the drawings), or the sets composed of the working members of different types. Thus, as shown in FIG. 6, the end seal comprises a set 28 of working members comprising the antifriction sliding ring 6, the bevel elastic ring 21 and the metal ring 14 having one shoulder, and a set 29 of working members comprising the antifriction sliding ring 6, the bevel elastic ring 21 and the metal ring 22 having the annular groove 23 and the blades 20.

The set 28 of the working members is accommodated in a chamber 30 for sealing fluid, and the set 29 is accommodated in a chamber 31 for sealing fluid, the chamber 30 being defined on the side of the set 29 of the working members by a distribution ring 32 which is adapted to direct the streams of sealing and cooling fluids. The distribution ring 32 comprises an axially split cylindrical sleeve. The distribution ring 32 is externally provided with an annular groove for a shroud. The distribution ring 32 is made of an antifriction material, such as of PTFE. The distribution ring 32 is snug fitted in the annular recess of the shaft 1 and is fixed by means of a shroud comprising cotton threads. The distribution ring 32 is also snug fitted in the housing 4.

The housing 4 of the seal is provided with a passage 33 through which sealing fluid is fed into the chamber 31 under a pressure which is equal to or somewhat lower than the pressure in the apparatus to cool the set 29 of the working members from the outside. Sealing fluid is discharged from the chamber 32 through a passage 34 of the housing 4, the circulation of the sealing fluid through the chamber 5 being caused by the blades 20 of the metal ring 22 during the rotation of the shaft 1.

Cooling fluid flows through a passage 35 under a pressure which is lower than that of the sealing fluid in the chamber 31, wherefrom it is fed through radial passages 36 into an annular passage 37 of the shaft 1 and then into an axial passage 38 of the shaft 1. Thus, the cooling fluid cools the antifriction sliding ring 6 and cools from the inside the metal ring 22 and the lower (as shown in the drawing) end of the shaft 1. Then the cooling fluid leaves the axial passage 38 through radial passages 39 to flow into the chamber 30 so as to first cool the set 28 of the working members from the outside and to be then discharged outside through a port 40 in the seal housing 4. During the circulation the cooling and sealing fluids remove the products of wear of the seal working members which is highly favourable for good performance of the end seal.

Cooling fluid in such an end seal having two sets of working members may comprise town water.

Sealing fluid may comprise mineral oil, and where oil is inadmissible, distilled water may be used, as well as town water and technological solutions, provided that they do not damage the working members of the seal.

Figure 7:
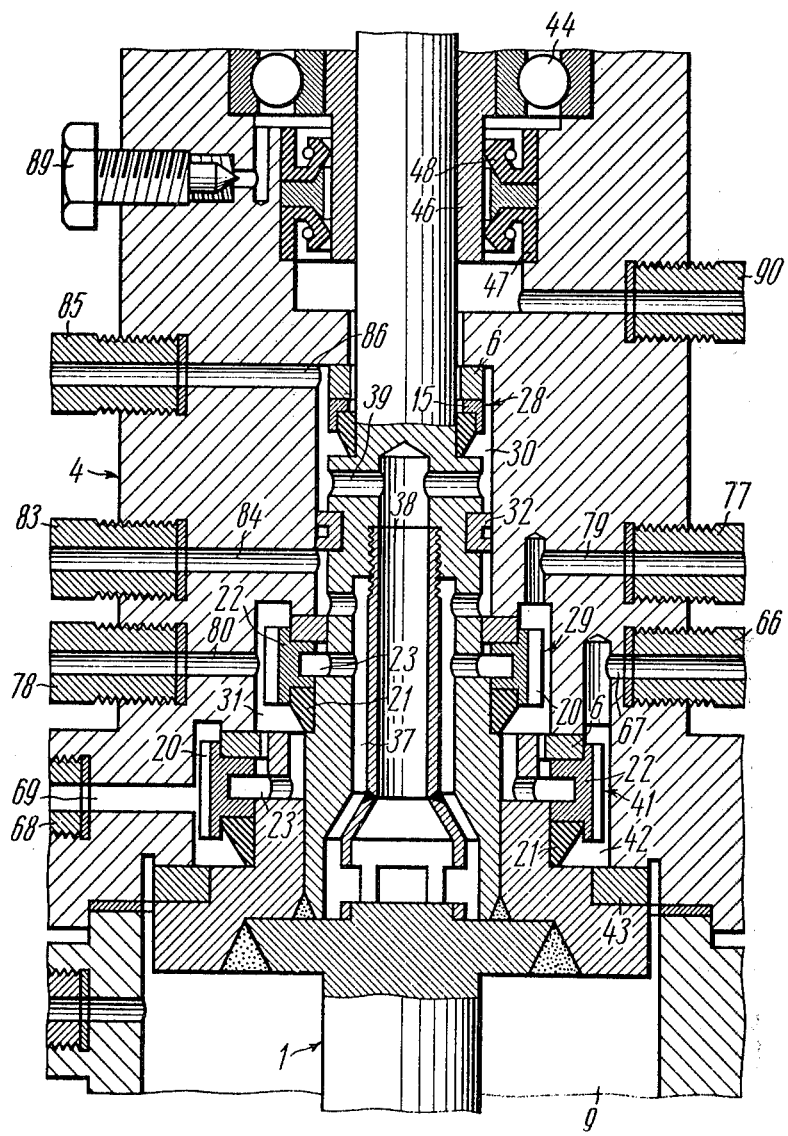
FIG. 7 shows a longitudinal section of an end seal according to the invention having three sets of working members.

The end seal shown in FIG. 7 comprises three sets 28, 29 and 41 of the working members which form three sealing stages, the set 41 comprising the working members similar to the working members of the set 29. The shaft 1 and the housing 4 of the seal include a plurality of portions of different diameters so that the set 41 of the working members, which is the nearest one to the working space 9 of the apparatus, has the largest diameter of the working members, and the set 28, which is the most remote one from the working space 9 has the smallest diameter of the working members.

The set 41 of the working members comprises a chamber 42 for sealing fluid separated from the working space 9 of the apparatus by an antifriction sliding ring 43 of carbongraphite which constitutes an additional sealing stage. One end face of the antifriction sliding ring 43 is in contact with a respective annular shoulder of the shaft 1, while the other end face of the ring 43 is in contact with a respective annular shoulder of the seal housing 4. The antifriction sliding ring 43 is snug fitted on the shaft 1.

The cavity of the annular groove 23 of the set 41 of the working members communicates with the chamber 31 of the set 29 of the working members, while the cavity of the annular groove 23 of the set 29 of the working members communicates through the annular passage 37, the axial passage 38 and the radial passages 39 with the chamber 30 of the set 28 of the working members.

Figure 8:
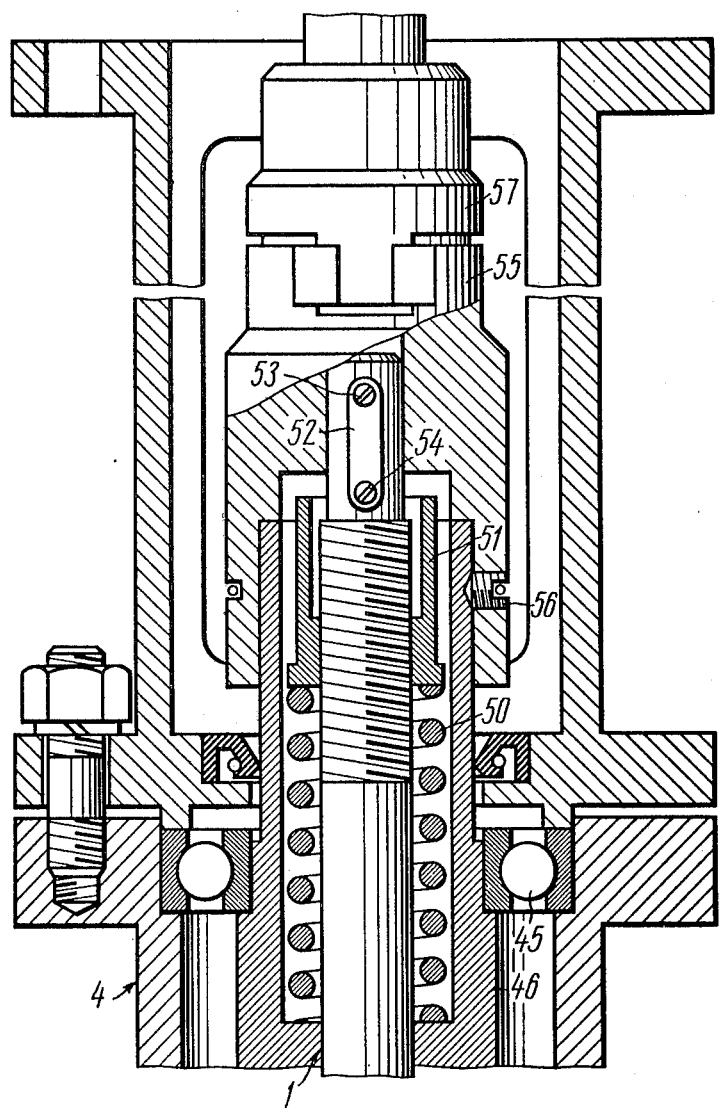
FIG. 8 shows a longitudinal section of a portion of the shaft shown in FIG. 7 facing towards the drive.

Mounted in the top portion of the seal housing 4 are ball bearings 44 and 45 (FIG. 8), and a sleeve 46 having portions of different diameters is journalled in these ball bearings and is sealed in the housing 4 by means of rubber collars 47 and 48 (FIG. 7) and a distance piece 49 mounted therebetween. means The upper end of the shaft 1 is journalled in the bore of the sleeve 46 with snug fit and is loaded by a helical spring 50 (FIG. 8). The spring 50 is mounted inside the sleeve 46 having portions of different diameters so that one end of the spring 50 abuts against the end face of a shoulder of the sleeve 46, and the other end of the spring rests against a nut 51 threaded on the shaft 1. To transmit the rotation, the upper end of the shaft is provided with a key fixed by means of two screws 53 and 54. A member of a jaw coupling 55 is snug fitted on the sleeve 46 and secured by meanas of a fastener 56.

The end of the shaft 1 provided with the key 52 is received with snug fit in the bore of the coupling member 55 which has a keyway.

This end seal may be used e.g. for sealing the shaft of an electric motor-reducer unit. In this case a coupling member 57 of the motor-reducer unit is coupled with the jaw coupling member 55.

Figure 9:
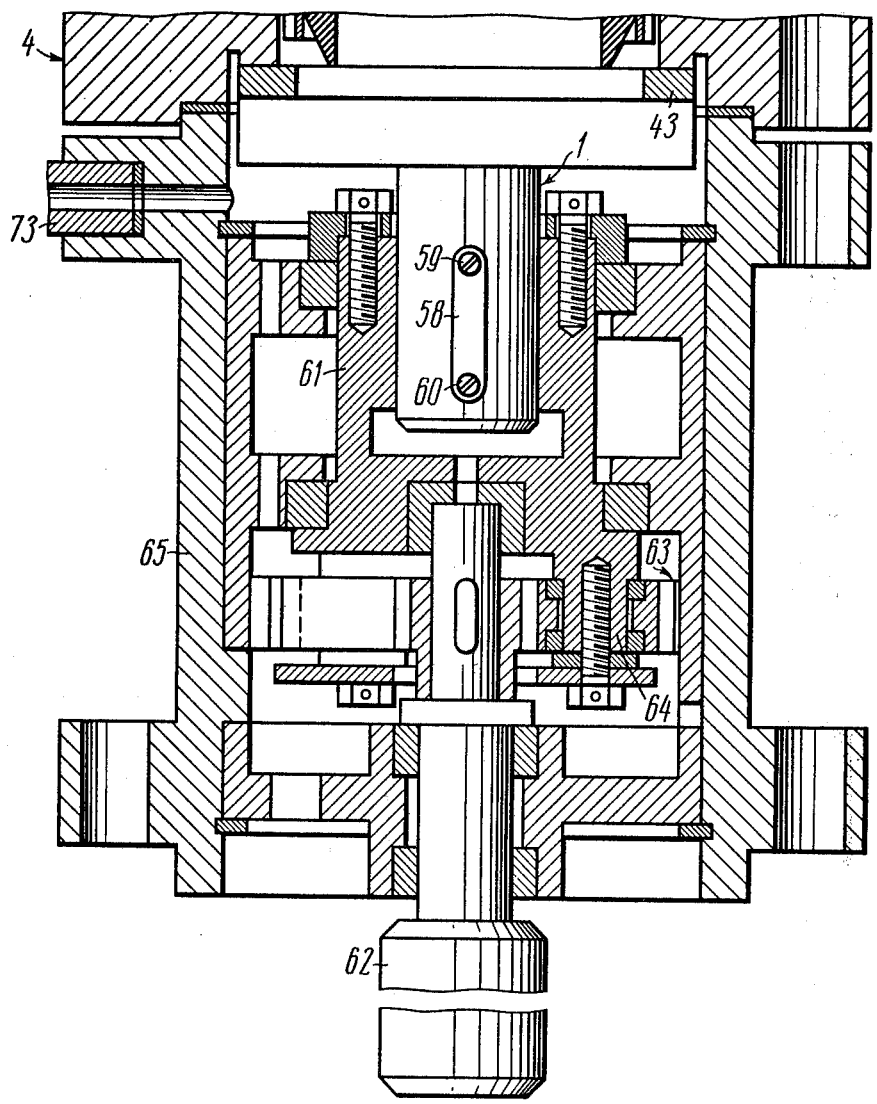
FIG. 9 shows a longitudinal section of a portion of the shaft shown in FIG. 7 facing towards the working space of the apparatus.

The end of the shaft 1 facing the apparatus is provided with a key 58 (FIG. 9) secured by means of two screws 59 and 60. A longitudinal coupling 61 having a keyway is snugly fitted on the end of the shaft 1 having the key 58.

A working member of the apparatus, e.g. the agitating member is preferably fixed on a separate shaft 62 rather than directly on the shaft 1.

The shaft 62 is coupled to the shaft 1 by means of a step-up planetary transmission gear 63 of the motor-reducer unit, the carrier 64 of the transmission gear comprising the extension of the longitudinal coupling 61. The shaft 62 may be coupled to the shaft 1 also without a planetary transmission gear by using one longitudinal coupling only (not shown).

The elimination of the rigid coupling between the shafts 1 and 62 of the agitating arrangement allows for relative axial displacement of the shafts 1 and 62 which is necessary to eliminate the relative influence of axial shifts of the shafts 1 and 62 during the operation of the apparatus.

A housing 65 of the planetary transmission gear 63 is tightly mounted with its flange on the flange of the apparatus having the motor-reducer unit.

Sealing fluid is supplied into the end seal illustrated in FIG. 7 as follows.

Sealing fluid is fed into the chamber 42 of the set 41 of the working members through a connection 66 communicating with a passage 67 of the housing 4, while the discharge of the sealing fluid from the chamber 42 is effected through a connection 68 communicating with a passage 69 of the housing 4.

A tightly sealed tank 70 provided with a water jacket (FIG. 10) serves for circulation, refining and cooling of the sealing fluid and for its supply into the chamber 42. The pressure of the sealing fluid in the tank 70 is indicated by a pressure gauge 71.

The top portion of the tank 70 communicates by means of a conduit 72 and a connection 73 (FIGS. 9, 10) with the working space of the apparatus, whereby the operating pressure is transmitted to the tank 70 (FIG. 10), and the sealing fluid in the chamber 42 (FIG. 7) is under a pressure which is equal to or somewhat lower than the operating pressure in the apparatus.

In the order to effect the hydraulic unloading of the end seal, the sealing fluid in the next chamber 31 remote from the working space 9 of the apparatus should be under a pressure lower than that in the chamber 42.

A water-cooled tank 73 (FIG. 10) is adapted to circulate, refine and cool sealing fluid and to feed it into the chamber 31 under reduced pressure, the sealing fluid being fed into this tank from the tank 70 through a conduit 74 and a stepdown pressure reducer 75. The pressure in the tank 73 is indicated by a pressure gauge 76. The tank 73 communicates with connections 77 and 78 mounted in the walls of the housing 4 of the seal. The connection 77 communicates with a passage 79 (FIG. 7) of the seal housing 4 and is adapted to supply the sealing fluid into the chamber 31, while the connection 78 communicates with a passage 80 of the housing 4 and serves to discharge the sealing fluid from the chamber 31.

A column 82 supports the tanks 70 and 73 (FIG. 10), the communication conduits of the housing 4 and an electric motor 81.

Circulation of the cooling water fed into the seal housing 4 to cool the set 28 (FIG. 7) of the working members of the seal, and especially the end of the shaft 1 which is located in the working space 9 of the apparatus at elevated temperature of the medium being handled, is effected through an inlet connection 83 mounted in the wall of the seal housing 4 and communicating with a passage 84 of the housing 4, and through an outlet connection 85 communicating with a passage 86 of the housing 4.

Used oil is discharged from the cavity of the ball bearings 44 and 45 (FIG. 8) through a plug 89 (FIG. 7) and a connection 90.

Prior to the assembly of the end seal shown in FIG. 7 the shaft 1 is lubricated with machine oil and then the rings of the seal members are fitted thereon beginning with the antifriction sliding ring 43 with the bore of the largest diameter and completing with the antifriction sliding ring 6 of the set 28 of the working members of the smallest diameter of the bore.

The distribution ring 32 is then mounted in the annular groove of the shaft 1 and is bandaged with the shroud.

The sleeve 46 with portions of different diameters having the ball bearings 44 and 45 is mounted in the top portion of the seal housing 4. The shaft 1 having the sets 28, 29, 41 (FIG. 7) of the seal members is introduced with its threaded end into the sleeve 46 having portions of different diameters, after which the helical spring 50 is installed (FIG. 8), and the nut 51 is screwed on until the antifricttion sliding ring 43 (FIG. 7) securely seals the end faces of the housing 4 and the shaft 1. Therefore, the sets 28, 29, 41 of the seal working members reliably seal the remaining end faces of the housing 4 and shaft 1.

Then the jaw coupling member 55 is mounted on the sleeve 46, and the end of the shaft 1 having the key 52 is fixed to the sleeve 46 by means of the fastener 56.

The longitudinal coupling 61 is mounted on the end of the shaft 1 having the key 58 (FIG. 9) so as to be axially movable with snug fit. Then the column 82 (FIG. 10) is mounted, and the tanks 70 and 73 are suspended thereto and are coupled by means of conduits with the connections of the housing 4 and filled with sealing fluid, after which the tanks are tightly sealed with plugs. Now the seal is ready for installation in the apparatus and for coupling of the motor-reducer unit of the electric drive.

The end seal functions as follows.

When a pressure is developed in the working space 9 (FIG. 7) of the apparatus, the shaft 1 having the sets 28, 29, 41 of the working members of the seal mounted thereon is urged against the end faces of respective shoulders of the housing 4.

At the same time a vapourous and gaseous medium is fed from the working space 9 of the apparatus incorporating the end seal into the tank 70 (FIG. 10), sealing fluid is expelled from the tank 70 through the connection 66 into the chamber 42 of the set 41 of the working members, wherein it tightly compresses the elastic ring 21 around the shaft 1 to thereby seal the set 41 of the working members more tightly over the end faces of the annular shoulders of the housing 4 and shaft 1. Therefore, the bevel elastic ring 21 is reliably externally sealed along its cone base inside the shoulder of the metal ring 22 so as to be securely coupled therewith, whereby the elastic ring is prevented from rotating about the shaft 1.

Figure 10:
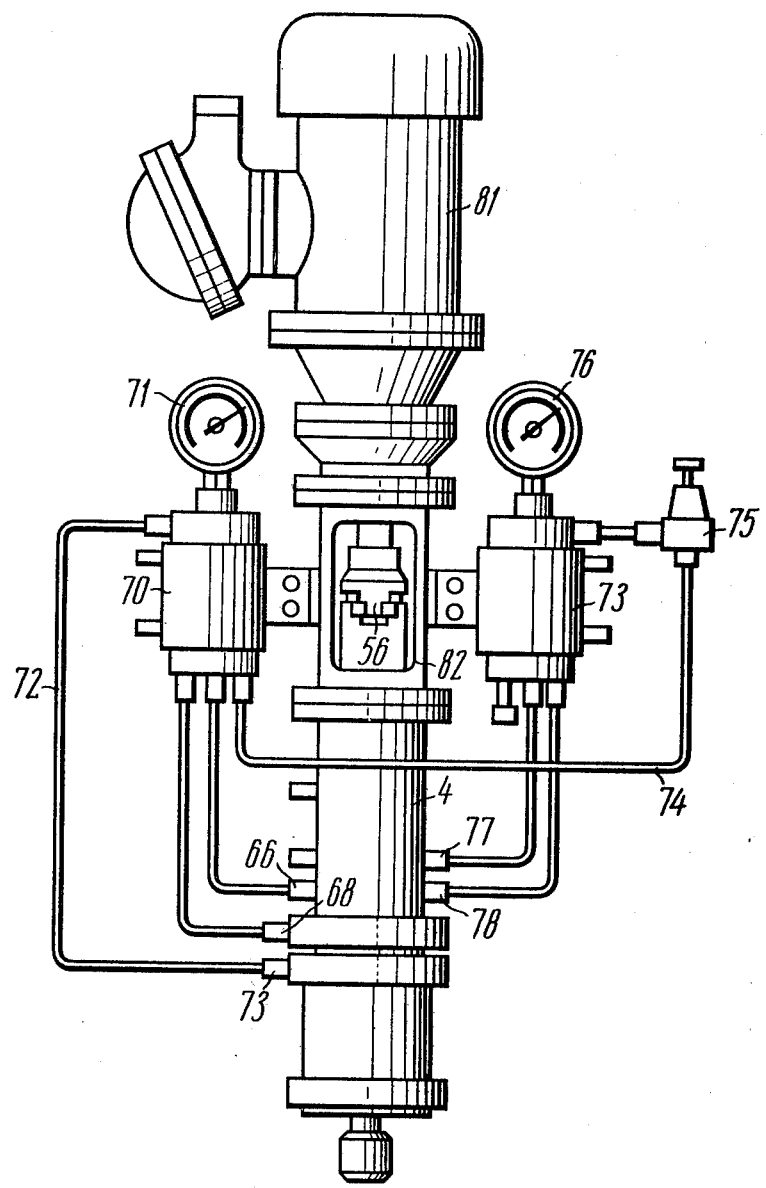
FIG. 10 is a general view of the end seal according to the invention, shown with the drive.

During the rotation of the shaft 1 the metal ring 22 pumps the sealing fluid by its blades 20 into the connection 68 and therefrom through a conduit into the tank 70 (FIG. 10). Therefore, a circulation circuit is formed to ensure the supply, cooling and refining of the sealing fluid fed into the chamber 42 (FIG. 7) of the seal working members.

The sealing fluid is fed from the tank 70 (FIG. 10) through the conduit 74 and the pressure reducer 75 into the tank 73, wherefrom it is fed through a conduit and the connection 77 into the chamber 31 (FIG. 7) of the seal working members.

Here the sealing fluid will compress the elastic sealing ring 21 of the set 29 of the working members around the shaft 1 so as to securely seal the set 28 of the working members over the end faces of the respective annular shoulders of the housing 4 and the shaft 1. The bevel elastic ring 21 is reliably sealed with its cone base inside the shoulder of the metal ring 22 of the set 29 to thereby reliably secure the metal ring 22 on the shaft 1 against rotation.

The sealing fluid cooles the set 19 of the working members from the outside, and while penetrating into the cavity of the annular groove 23 of the set 41, it also cools and lubricates from the inside the antifriction sliding ring 6 and the metal ring 22 of the set 41 of the working members.

During the rotation of the shaft 1 the metal ring 22 of the set 29 will pump, through intermediary of its blades 20, the sealing fluid through the connection 78 into the tank 73 (FIG. 10). Therefore, there is formed a second circulation circuit for supply, cooling and refining of the sealing fluid to be fed into the chamber 31 (FIG. 7) of the set 29 of the seal members.

During the operation of the end seal the wear of the carbon-graphite antifriction sliding rings takes place in all the seal sets. The gap formed due to the concurrent wear of all the carbon-graphite rings is compensated for due to the displacement of the shaft 1, together with the sets 28, 29 and 41 of the seal members, axially upwardly under the action of the spring 50 (FIG. 8) and pressure of the fluid in the working space of the apparatus incorporating the end seal.

If the carbon-graphite antifriction rings are selectively worn over the shoulders of the end seals, the gap is automatically compensated for due to the compression of the sealing ring of a given set around the shaft 1 under the pressure of the sealing fluid which is fed into the seal chamber of that set of the working members. Thus the gaps are automatically compensated for upon the selective wear of the antifriction rings at all sealing stages.

When operating under elevated pressure, e.g. of several hundreds of atmospheres, the sets of working members of the end seal withstand high specific pressure wherein excessive wear and failure of the end seals generally take place.

In order to preclude the development of excessive stresses in the sets of the working members, one embodiment of the end seal enables the hydraulic unloading of the seal members, and it is for that purpose, that the sealing fluid is fed into the chamber 31 of the set 29 under a pressure which is lower than that of the sealing fluid in the chamber 42 of the set 41 of the working members, while the cavities of the annular grooves 23 of the metal rings 22 communicate with the chambers of the end seal in which there is reduced pressure as compared to that acting upon the outer surface of these working members.

Thus, the cavity of the annular groove 23 of the set 41 of the working members communicates with the chamber 31 of the set 29 of the working members, whereby the set 41 of the working members operates under a low pressure difference, which is equal to the difference between the pressures of the sealing fluid in the chamber 42 and chamber 31. This improves the tightness and performance of the end seal as a whole.

The set 28 of the working members operates under a pressure difference between the pressure of the sealing fluid in the chamber 31 and the pressure of the cooling fluid fed into the chamber 30 of the set 28 of the working members which serves to cool the housing 4 and especially the end of the shaft 1 adjacent to the working space 9 of the apparatus.

The set 28 of the working members is adapted to prevent leakage of the cooling fluid from the seal housing 4. This set 28 operates under a low pressure difference and with a good cooling, and for that reason its metal ring has no annular groove.

The annular grooves 23 in the metal rings 22 of the sets 29 and 41 of the working members have still another function.

During the operation of the end seal the wear of the carbon-graphite antifriction rings, as well as of the metal rings and elastic rubber rings takes place.

The products of the rings wear are collected in the annular grooves of the metal rings and are then discharge through the system of passages in the shaft 1 together with cooling and sealing fluids from the seal.

This method of removing the wear products substantially improves the performance of the end seal.

An outstanding feature of this embodiment of the end seal is the automatic self-sealing.

In the case of failure of one of the sets of working members the next set of the working members will automatically take up its load.

The use of the hydraulic unloading of the sealing stages of the seal permits design of the seals so as to be suitable for operation under a pressure of several hundreds of atmospheres.

What is claimed is:

1. A rotary shaft end seal for apparatus operating under pressure comprising: a housing embracing the shaft; an annular shoulder on the inner surface of said housing; an annular shoulder on said shaft embraced by said housing having an end face facing an end face of said annular shoulder of said housing; a set of working members disposed between said end faces of said annular shoulders of the shaft and housing; an antifriction sliding ring which is one of said working members of said set, said ring being floatingly fitted on said shaft in contact with said end face of one of said annular shoulders; an elastic ring forming a second of said working members of said set, said elastic ring being tightly fitted on said shaft in contact with said end face of said annular shoulder on the shaft; a metal sliding ring which is a third of the working members of said set, said metal ring being located between said antifriction sliding ring and the elastic ring and loosely and slidably mounted on said shaft; a chamber for sealing fluid in said housing accommodating said set of the working members and serving for circulation of sealing fluid therethrough; passages in said housing for admission and discharge of the sealing fluid from said chamber, said annular shoulders of said shaft and housing imparting an axial displacement to the shaft responsive to a force applied to said shaft by the internal pressure in said apparatus so as to compress said set of the working members; and means for spring-loading said shaft in the direction of its displacement resulting in the compression of said set of the working members.

2. An end seal according to claim 1, wherein said antifriction sliding ring is in contact with said end face of sand annular shoulder of said housing, and said elastic ring is in contact with said end face of said annular shoulder of said shaft.

3. An end seal according to claim 1, wherein said antifriction sliding ring is made of carbon-graphite.

4. An end seal according to claim 1, wherein said elastic ring is made of a chemically and heat resistant rubber.

5. An end seal according to claim 1, wherein said metal sliding ring is provided with a shoulder made at one end face thereof which embraces the outer periphery of said elastic ring over a fraction of its height.

6. An end seal according to claim 4, wherein said metal sliding ring is provided with a shoulder at one end face thereof which embraces the outer periphery of said elastic ring over a fraction of its height.

7. An end seal according to claim 4, wherein said elastic ring is made externally conical.

8. An end seal according to claim 7, wherein said elastic ring is made externally conical.

9. A rotary shaft end seal for apparatus operating under pressure comprising: a housing embracing the shaft; an annular shoulder on the inner surface of said housing; an annular shoulder on said shaft embraced by said housing, said shoulder having an end face facing an end face of said annular shoulder of said housing; a set of working members located between said end faces of said annular shoulders of the shaft and housing; an antifriction sliding ring which is one of the working members of said set, said ring being floatingly fitted on said shaft in contact with said end face of said annular shoulder of the housing; an elastic ring which is a second of said working members of said set, said elastic ring being tightly fitted on said shaft in contact with said end face of said annular shoulder of the shaft; a metal sliding ring which is a third working member of said set, said metal ring being located between said antifriction sliding ring and the elastic ring and loosely and slidably mounted on said shaft; two axially projecting shoulders formed one at each respectively of the end faces of said metal sliding ring, one of the shoulders embracing the outer periphery of said elastic ring over a fraction of its height, and the other shoulder embracing said antifriction sliding ring in the same manner; a chamber for sealing fluid in said housing serving for circulation of the sealing fluid therethrough; passages in said housing for admission of the sealing fluid into said chamber and for its discharge therefrom; said annular shoulders of said shaft and housing imparting an axial displacement to the shaft responsive to a force applied to said shaft by the internal pressure in said apparatus so as to compress said set of the working members; and means spring-loading said shaft in the direction of its displacement resulting in the compression of said set of the working members.

10. An end seal according to claim 9, wherein said metal sliding ring is externally provided with blades, said blades forming a pump in operative association with the adjacent inner surface of said chamber for sealing fluid providing the circulation of the sealing fluid through said chamber during the rotation of said shaft.

11. An end seal according to claim 9, wherein said elastic ring is made externally conical.

12. An end seal according to claim 10, wherein said elastic ring is made externally conical.

13. An end seal according to claim 9, wherein said metal sliding ring is internally provided with an annular groove open to said shaft, while said housing and shaft are provided with passages communicating with the cavity of the groove and serving to feed thereinto and to discharge therefrom a cooling fluid.

14. An end seal according to claim 10, wherein said metal sliding ring is internally provided with an annular groove open to said shaft, while said housing and shaft are provided with passages communicating with the cavity of the groove and serving to feed thereinto and to discharge therefrom a cooling fluid.

15. An end seal according to claim 11, wherein said metal sliding ring is internally provided with an annular groove open to said shaft, while said housing and shaft are provided with passages communicating with the cavity of said groove and serving to feed thereinto and to discharge therefrom a cooling fluid.

* * * * *